(No Model.)
A. C. BROWNELL.
ROLLER BEARING.
No. 582,599. Patented May 11, 1897.
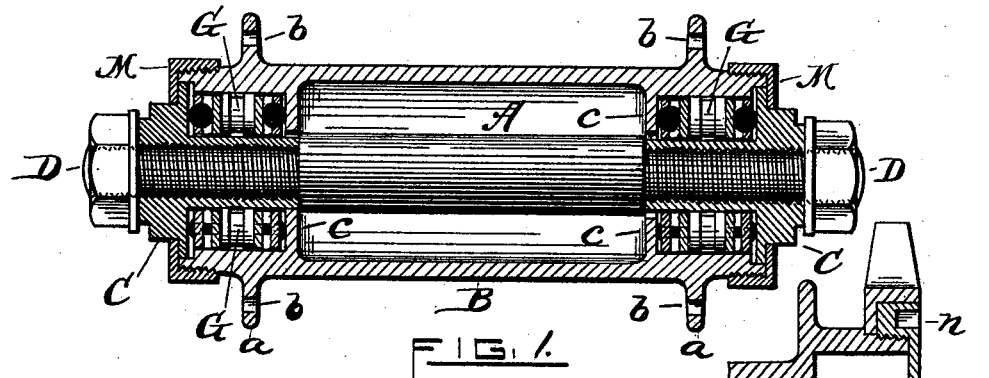
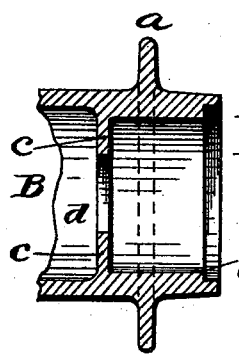
FIG. 2.
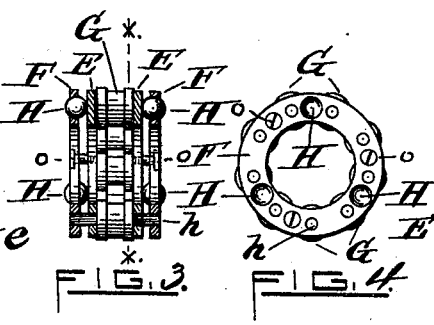
FIG. 3. FIG. 4. FIG. 5.
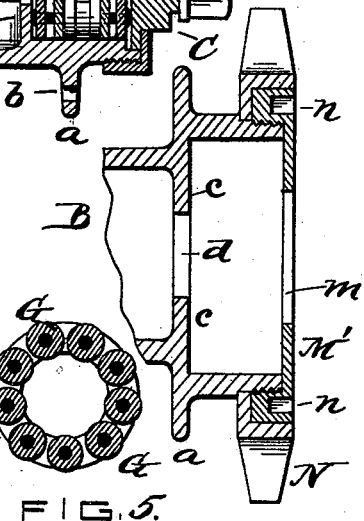
FIG. 10.
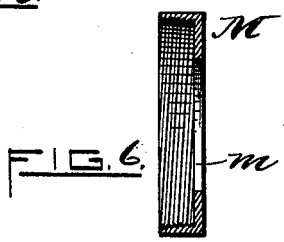
FIG. 6.
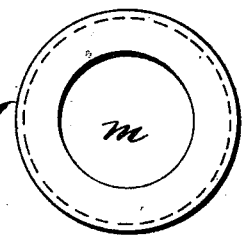
FIG. 7.
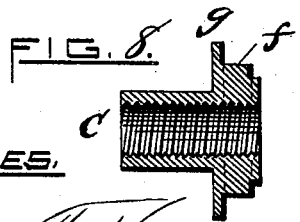
FIG. 8.
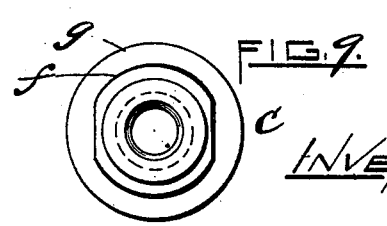
FIG. 9.
WITNESSES,
Charles T. Hannigan
Charles N. Hickman
INVENTOR,
Alexander C. Brownell
By Warren R. Perce
Atty.
THE NORRIS PETERS CO., PHOTO-LITHO., WASHINGTON, D. C.

UNITED STATES PATENT OFFICE.

ALEXANDER C. BROWNELL, OF PROVIDENCE, RHODE ISLAND, ASSIGNOR OF ONE-HALF TO HENRY T. McDONALD, OF SAME PLACE.

ROLLER-BEARING.

SPECIFICATION forming part of Letters Patent No. 582,599, dated May 11, 1897.

Application filed February 11, 1897. Serial No. 622,891. (No model.)

*To all whom it may concern:*

Be it known that I, ALEXANDER C. BROWNELL, of the city and county of Providence, in the State of Rhode Island, have invented a certain new and useful Improvement in Roller-Bearings for the Wheels of Bicycles and other Vehicles; and I declare the following to be a specification thereof, reference being had to the accompanying drawings.

Figure 1 is a longitudinal section of my invention with the axle shown in front elevation. Fig. 2 is a longitudinal section of the hub at and near the end thereof. Fig. 3 is a diametrical section of the cage wherein the rollers are mounted, the rollers and ball-bearings being shown in elevation. Fig. 4 is an end elevation of the same. Fig. 5 is a view of the same as seen in section on line $x\,x$ of Fig. 3. Fig. 6 is a view of the dust-cap as seen in diametrical section. Fig. 7 is a front elevation of said dust-cap. Fig. 8 is a view of the holding-nut as seen in diametrical section. Fig. 9 is a front elevation of said nut. Fig. 10 is a diametrical section of the hub at and near one end thereof, the sprocket-wheel on said hub, and the dust-cap at the sprocketed end of the hub.

Like letters indicate like parts.

My invention consists in the combination, with the wheel of a bicycle or other vehicle and the axle on which said hub is mounted, of a cage provided with rollers which are in rolling contact with a suitable bearing-surface secured to the axle, and also with balls, and a supporting-ring therefor on the sides of said cage adapted to resist the end-thrust friction of the wheel-hub against suitable bearing-surfaces, together with a dust-cap arranged and mounted to protect said rollers, balls, and supporting-rings from dust and moisture, as hereinafter particularly described.

In the drawings, A is the axle of the bicycle or vehicle, having its ends screw-threaded.

B is the hub, tubular in form and rotatable. The hub is screw-threaded upon its ends. It has the annular flanges $a\,a$, through the holes $b\,b$ of which the wire spokes of the wheel pass or are secured in the usual manner. The hub B also has the interior flanges $c\,c$, each with a central circular aperture $d\,d$ whose diameter is slightly greater than the diameter of the central part of the axle A. The hub B also is cut away at its ends to form a thin flange and a shoulder, as seen at $e$ in Fig. 2.

C C are sleeves screw-threaded and engageable upon the ends of the axle A, as shown. Each sleeve C has an enlarged head $f$ and a flange $g$, as shown in Figs. 1, 8, and 9.

D D are check-nuts screwed upon the threaded ends of the axle A and abutting the sleeves C C, respectively.

The cages are made of two rings E E. On the outer faces of the rings E E are the rings F F. Rollers G G are mounted in and between the rings E E upon pins $h$. The rings E E F F are held together by the screws $o\,o$.

The rollers G G are preferably channeled circumferentially in their central part, so as to leave at their ends circumferential bearing-surfaces, as seen in Figs. 1 and 3.

The rings F F have conical holes, and balls H H are loosely mounted in said holes and slightly protrude therefrom, as shown in Figs. 1 and 3.

The rollers G G, as seen in Fig. 1, have their bearings upon the tubular extensions of the sleeves C C, respectively, and the balls H H on the inner sides of the cages have their bearings against the inner flanges $c\,c$ of the hub B, while the balls H H on the outer sides of the cages have their bearings against the inner surface of the heads or flanges of the sleeves C C, respectively.

M M are caps having a central circular aperture $m$ of a diameter to receive the head $f$ of the sleeve C, and its circumferential flange is screw-threaded on the inside to engage with the screw-threaded end of the hub B.

N is the sprocket-wheel, brazed or otherwise fastened upon the hub. It has a circular channel, Fig. 10, within which the flange of the cap M' is received, which screws upon the end of the hub. The holes or sockets $n\,n$ are provided for the reception of a spanner-wrench, by which the cap M' can be screwed into position.

The parts are assembled as shown in Fig. 1, where it is seen that the rollers G G give a vertical rolling bearing to the wheel-hub, while the balls H H give lateral or endwise bearings, the latter being especially important when the bicycle or vehicle is describing a short curve, in which case the bearing of the hub is both perpendicular to the axle and lateral at the same time.

The cap M or M' prevents dampness or dust from reaching the roller, balls, or bearings, and so protects them from being worn by grit.

I claim as a novel and useful invention and desire to secure by Letters Patent—

1. In combination with the wheel of a bicycle or vehicle, a tubular, rotatable hub, an axle having screw-threaded ends, a sleeve on each end of the axle and provided with an annular head, an annular flange extending from said sleeve within the bore of the hub but surrounding the axle, cages having rollers which are mounted therein and bear on said sleeves, respectively, rings properly mounted on said cages and having conical holes, and balls mounted in said holes and bearing against the head of the sleeves and against said annular flanges, respectively, substantially as specified.

2. In combination with a bicycle wheel and axle, a cage surrounding said axle within the hub of the wheel and consisting of two rings, rollers mounted between said rings, two outer rings mounted on said cages, having conical holes, balls mounted in said holes so as to slightly protrude outwardly therefrom and means for fastening all said rings together, substantially as set forth.

ALEXANDER C. BROWNELL.

Witnesses:
WARREN R. PERCE,
CHARLES A. WILKINSON.